(12) United States Patent
Hahn

(10) Patent No.: US 8,164,627 B1
(45) Date of Patent: Apr. 24, 2012

(54) CAMERA SYSTEM FOR VEHICLES

(75) Inventor: Wolfgang Hahn, Schwabhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2750 days.

(21) Appl. No.: 10/110,759

(22) PCT Filed: Oct. 12, 2000

(86) PCT No.: PCT/EP00/10051
§ 371 (c)(1),
(2), (4) Date: Aug. 26, 2002

(87) PCT Pub. No.: WO01/29513
PCT Pub. Date: Apr. 26, 2001

(30) Foreign Application Priority Data

Oct. 16, 1999 (DE) ................................ 199 50 033

(51) Int. Cl.
*H04N 7/18* (2006.01)
(52) U.S. Cl. ...................................................... 348/148
(58) Field of Classification Search .......... 348/143–157, 348/114; 700/56; 701/210, 1, 25; 382/104; 340/932.2; H04N 7/18
See application file for complete search history.

(56) References Cited

U.S. PATENT DOCUMENTS

| | | | | |
|---|---|---|---|---|
| 4,855,822 A * | 8/1989 | Narendra et al. | .............. | 348/114 |
| 5,155,683 A * | 10/1992 | Rahim | ............................. | 701/25 |
| 5,461,357 A * | 10/1995 | Yoshioka et al. | ............. | 340/435 |
| 5,559,695 A | 9/1996 | Daily | | |
| 5,633,946 A | 5/1997 | Lachinski et al. | | |
| 5,646,614 A * | 7/1997 | Abersfelder et al. | ...... | 340/932.2 |
| 5,894,323 A | 4/1999 | Kain et al. | | |
| 5,999,865 A * | 12/1999 | Bloomquist et al. | ............ | 701/25 |
| 6,032,098 A * | 2/2000 | Takahashi et al. | ............ | 701/210 |
| 6,226,389 B1 * | 5/2001 | Lemelson et al. | ............. | 382/104 |
| 6,463,369 B2 * | 10/2002 | Sadano et al. | ................... | 701/28 |
| 6,483,429 B1 * | 11/2002 | Yasui et al. | ................... | 340/435 |
| 6,587,760 B2 * | 7/2003 | Okamoto | .......................... | 701/1 |
| 6,690,978 B1 * | 2/2004 | Kirsch | ............................ | 700/56 |
| 6,704,621 B1 * | 3/2004 | Stein et al. | ....................... | 701/1 |

FOREIGN PATENT DOCUMENTS

| | | |
|---|---|---|
| DE | 41 24 654 A1 | 1/1993 |
| DE | 41 38 270 A1 | 5/1993 |
| FR | 2 785 434 | 5/2000 |
| JP | 64-44512 | 2/1989 |
| JP | 05-238314 | 9/1993 |
| JP | 05278522 | * 10/1993 |
| JP | 05278522 A | * 10/1993 |
| JP | 09-096508 | 4/1997 |
| JP | 10-262239 | 9/1998 |

* cited by examiner

*Primary Examiner* — Tung Vo
(74) *Attorney, Agent, or Firm* — Crowell & Moring LLP

(57) ABSTRACT

The invention relates to a camera system for vehicles comprising a camera with variable orientation for capturing the course of the road in front of a vehicle. The control of the camera by a controller is disclosed, which guarantees a good spatial resolution when travelling around corners as well as when travelling straight ahead. The controller receives vehicle dynamic travel parameters or satellite information on the current location of the vehicle, the course and/or geographical position of the road.

23 Claims, 1 Drawing Sheet

CAMERA SYSTEM FOR VEHICLES

The invention relates to a camera system for vehicles having a variable-orientation camera for capturing a course of the road to be traveled in front of a vehicle. A control unit is provided which controls the orientation of the camera.

Variable-orientation camera systems for vehicles are generally known. With respect to the wider field associated with the invention, reference is made to European Patent Document EP 0 782 059 A1, International Patent Document WO 9219811 A1 and U.S. Pat. No. 5,121,200. However, it is not known from these documents to already swivel the camera into the correct direction before the start of a cornering.

Furthermore, camera systems, particularly infrared cameras, have a limited field of view which is adapted to a sensor task by the lens system used. For example, for use in close range, a large horizontal field of view is required by means of which, however, for reasons of resolution, often no applications can be implemented in the remote range.

From U.S. Pat. No. 5,894,323, a camera and image processing system, particularly for an airplane, is known in which a camera, while capturing airplane movement parameters, is controlled such that a capturing range to be covered can be covered independently of flight movements. However, this system describes no application in the case of a vehicle for which a course of a road to be driven is to be captured.

It is an object of the invention to further develop a camera system of the above-mentioned type such that a continuous capturing of the course of the road in front of the vehicle can be obtained while the resolution is good.

The invention achieves this object by providing a variable-orientation camera for capturing a course of the road to be traveled in front of a vehicle. A control unit is provided which controls the orientation of the camera. The control unit obtains driving-related parameters of the vehicle and/or satellite-based information concerning the actual (current) location of the vehicle, the course and/or the geographical (local) position of the road. The control unit is constructed such that the camera can be pre-adjusted before the start or end of a cornering in the direction of the course of the road which will then follow.

The adjustable, particularly swivellable camera is already adjusted before the start of a cornering, in the direction of the then following course of the curve. Thus, it is possible to start the cornering with a camera which has already been swiveled into the correct direction. This correspondingly applies during the cornering. There also, the capturing of the course of the road is achieved in the further course of the curve by a corresponding prior swiveling of the camera. A corresponding adjustment can also be made for the end of the curve where the camera captures the adjoining straight course or the continuation of the road in time and while still in the curve.

The information concerning an imminent cornering may originate from driving-related parameters and/or from a satellite-based information system (GPS=Global Positioning System). The precision of the satellite-based information even today is sufficient in most cases for supplying useful information concerning the actual location of the vehicle. With the increasing improvement of the precision of this information, the orientation of the camera with respect to the course of the road can be optimized. A combination of driving-related parameters and satellite-based information is particularly advantageous when several driving direction possibilities exist, for example, in the case of a fork in the road. In this case, the actually selected driving direction can be detected by way of driving-related parameters.

Advantageous embodiments of the invention are the object of additional claims.

Thus, it is possible, for example, to supply the control unit with the output signal of a navigation system. Since, as a rule, such a system exists anyhow, the variable camera orientation is an additional benefit of the navigation system.

The control unit may correspondingly be integrated in the navigation system. A system of this type will then, on the one hand, control an indication for the navigation and, in addition, a drive for changing the viewing direction of the camera.

Corresponding to the basic idea of the invention, by means of the control unit, the vertical orientation of the camera, which is, for example, laterally swivellable as a function of the course of the curve, could also be changed.

Finally, the swiveling of the camera can be carried out in the horizontal as well as in the vertical direction as a function of the vehicle speed. At a high speed, the swiveling takes place at a larger distance in front of the start of the curve than at a low speed. As a result, the camera system is permitted to adapt itself in time to the course of the road.

In addition, it is possible to also control the capturing range of a camera as a function of the existing information. For example, by means of a zoom function, a close or remote range can be adjusted depending on whether a longer straight-ahead drive or a drive around narrow curves is to be expected.

The camera may be arranged on a movable platform which is controlled by the control unit. As an alternative, it is also possible that only the lens system of the camera is varied so that the camera housing per se is arranged in a stationary manner. In the latter case, however, only a limited swiveling is possible.

As driving-related parameters, parameters can be used which point to a change of the driving direction, particularly the steering angle, the yaw angle or a lateral acceleration of the vehicle.

BRIEF DESCRIPTION OF THE DRAWINGS

In the following, the invention will be explained in detail with reference to the attached drawings.

DETAILED DESCRIPTION OF THE DRAWINGS

Figure 1:
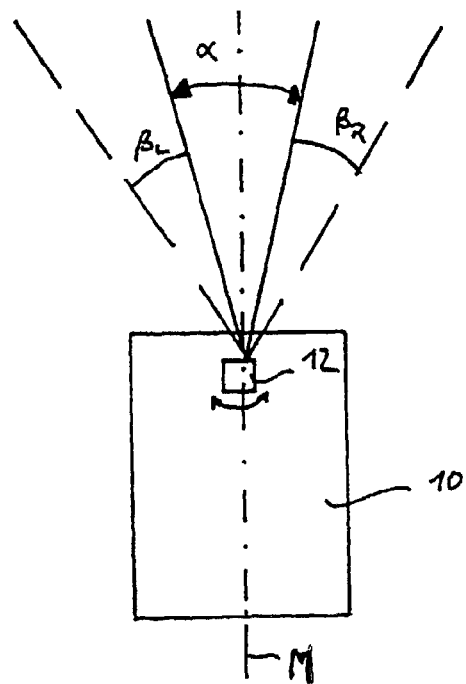
FIG. 1 is a schematic representation of a camera swivellably arranged on a vehicle.

FIG. 1 schematically outlines a vehicle 10 on which, essentially oriented in the driving direction, an infrared camera 12 is arranged on a horizontally swivellable platform (not shown in detail). The infrared camera 12 has a field of view with an aperture angle $\alpha$ of 10°. Furthermore, the infrared camera 12 can be swiveled to the right and to the left in each case by an angle $\beta(\beta_R, \beta_L)$ of 15° with respect to the center vertical line M. Thus, the infrared camera 12 covers a total angular range of 40° (15°+10°+15°). This angle range defines the virtual field of view.

Figure 2:
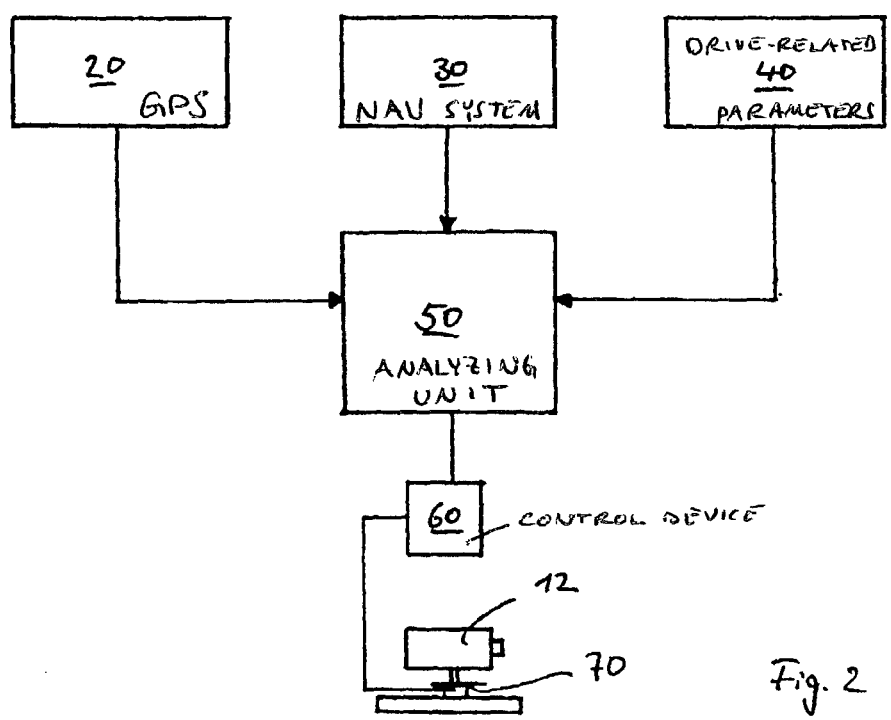
FIG. 2 is a block diagram of a control device for the suitable orientation of the camera illustrated in FIG. 1.

The swivellable platform is controlled by a control device illustrated in detail in FIG. 2.

A GPS system 20 supplies information concerning the actual (current) location of the vehicle, which it obtains from GPS satellite information, to an analysis unit 50 of the control device. Furthermore, a navigation system 30 obtains information concerning the course and the local position of the road on which the vehicle is currently located from a digital road map and also transmits it to the analysis unit 50. The analysis unit 50 also receives the steering angle as an input value. As an alternative, other driving-related parameters 40 may also be used as an input value. These parameters are present on a data bus to which the analysis unit 50 is connected.

In the analysis unit 50, the actual position of the vehicle and the outlook on the course of the road in front of the vehicle are calculated and are transmitted to a control device 60 for the swivellable platform. The control device 60 correspondingly acts upon the swivellable platform and a pertaining actuating engine 70 respectively.

If necessary, the camera can, in addition, also be adjusted in its vertical orientation or in its capturing field.

In this manner, it is possible to adapt the camera orientation to the actual situations and necessities of a drive. In particular, the use of the camera for the remote range can be maintained; that is, no more compromises have to be accepted with respect to the field of view. Simultaneously, by means of the adaptation of the camera orientation, the information-relevant area of the surroundings of the vehicle during cornering can be detected with a good spatial resolution. The images can then be offered either directly to the driver for his information or can be utilized by way of image processing for controlling longitudinal and/or lateral driving-related vehicle parameters.

The invention claimed is:

1. A camera system for a vehicle, comprising:
    a variable-orientation camera configured to capture a course of a road to be traveled in front of the vehicle;
    a control unit operatively coupled with the camera to control the variable-orientation, wherein the control unit receives as inputs at least one of driving-related parameters of the vehicle, satellite-based information concerning an actual location of the vehicle, a course of the road and a local position of the road; and
    wherein the control unit operates to pre-adjust, as a function of vehicle speed, the orientation of the camera before a start or end of a vehicle cornering in a direction of the course of the road which the vehicle will then follow.

2. The camera system according to claim 1, further comprising a navigation system which outputs a signal to the control unit on the location of the vehicle.

3. The camera system according to claim 2, wherein the control unit and the navigation system form an integrated unit.

4. The camera system according to claim 1, wherein the control unit controls both a horizontal and vertical orientation of the camera.

5. The camera system according to claim 2, wherein the control unit controls both a horizontal and vertical orientation of the camera.

6. The camera system according to claim 3, wherein the control unit controls both a horizontal and vertical orientation of the camera.

7. The camera system according to claim 1, wherein the control unit additionally controls a field of view of the camera.

8. The camera system according to claim 2, wherein the control unit additionally controls a field of view of the camera.

9. The camera system according to claim 3, wherein the control unit additionally controls a field of view of the camera.

10. The camera system according to claim 4, wherein the control unit additionally controls a field of view of the camera.

11. The camera system according to claim 1, further comprising a horizontally movable platform on which the variable-orientation camera is arranged, said movable platform being controlled by the control unit.

12. The camera system according to claim 2, further comprising a horizontally movable platform on which the variable-orientation camera is arranged, said movable platform being controlled by the control unit.

13. The camera system according to claim 3, further comprising a horizontally movable platform on which the variable-orientation camera is arranged, said movable platform being controlled by the control unit.

14. The camera system according to claim 4, further comprising a horizontally movable platform on which the variable-orientation camera is arranged, said movable platform being controlled by the control unit.

15. The camera system according to claim 7, further comprising a horizontally movable platform on which the variable-orientation camera is arranged, said movable platform being controlled by the control unit.

16. The camera system according to claim 1, wherein at least one of a steering angle, a yaw angle and a lateral vehicle acceleration are used as the driving-related parameters of the vehicle.

17. The camera system according to claim 2, wherein at least one of a steering angle, a yaw angle and a lateral vehicle acceleration are used as the driving-related parameters of the vehicle.

18. The camera system according to claim 3, wherein at least one of a steering angle, a yaw angle and a lateral vehicle acceleration are used as the driving-related parameters of the vehicle.

19. The camera system according to claim 4, wherein at least one of a steering angle, a yaw angle and a lateral vehicle acceleration are used as the driving-related parameters of the vehicle.

20. The camera system according to claim 7, wherein at least one of a steering angle, a yaw angle and a lateral vehicle acceleration are used as the driving-related parameters of the vehicle.

21. The camera system according to claim 11, wherein at least one of a steering angle, a yaw angle and a lateral vehicle acceleration are used as the driving-related parameters of the vehicle.

22. A method of controlling a camera system for a vehicle, the method comprising the acts of:
    obtaining at least one of driving-related parameters of the vehicle and satellite-based information concerning at least one of an actual location of the vehicle, a course of the road, and a local position of the road;
    supplying said at least one of the driving-related parameters and the satellite-based information to a vehicle control unit; and
    adjusting the orientation of the camera, as a function of vehicle speed, in a direction of a course of the road which will be followed by the vehicle before starting or ending a cornering operation of the vehicle in the direction of the course of the road.

23. A computer-readable medium encoded with a computer program for capturing, with a camera system, a course of a road to be traveled in front of a vehicle, the computer program comprising instructions for:
    interpreting at least one of driving-related parameters of the vehicle and satellite-based information concerning at least one of an actual location of the vehicle, a course of the road, and a local position of the road; and
    outputting control signals to adjust an orientation of the camera system such that the camera is pre-adjustable, as a function of vehicle speed, before starting or ending a cornering operation of the vehicle over the course of the road which the vehicle will follow.

* * * * *